Aug. 8, 1967

A. W. HUGHES 3,334,674

COMBINATION EMULSIFYING AND DEAERATING MACHINE
FOR SAUSAGE BATTER AND THE LIKE

Filed Oct. 2, 1964

INVENTOR
ALVIN W. HUGHES by: Wolfe, Hubbard, Voit & Osann
ATTYS.

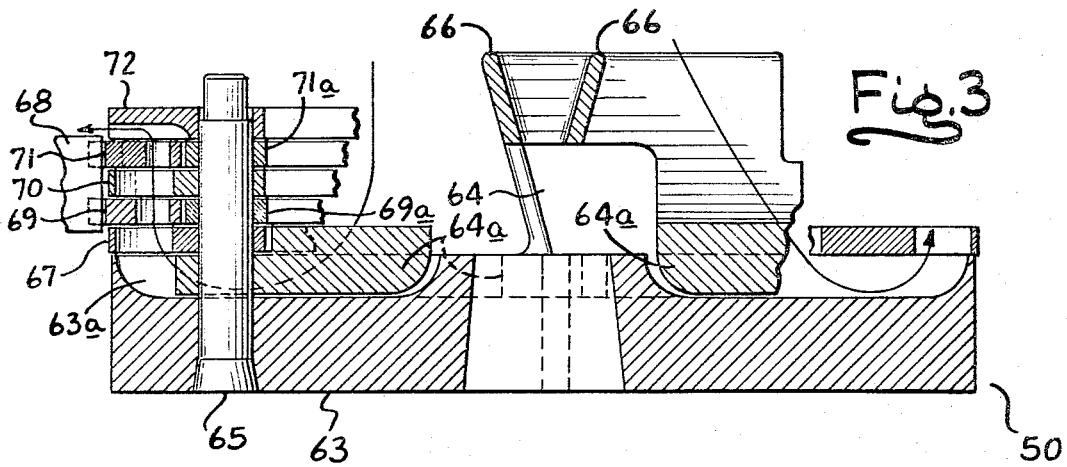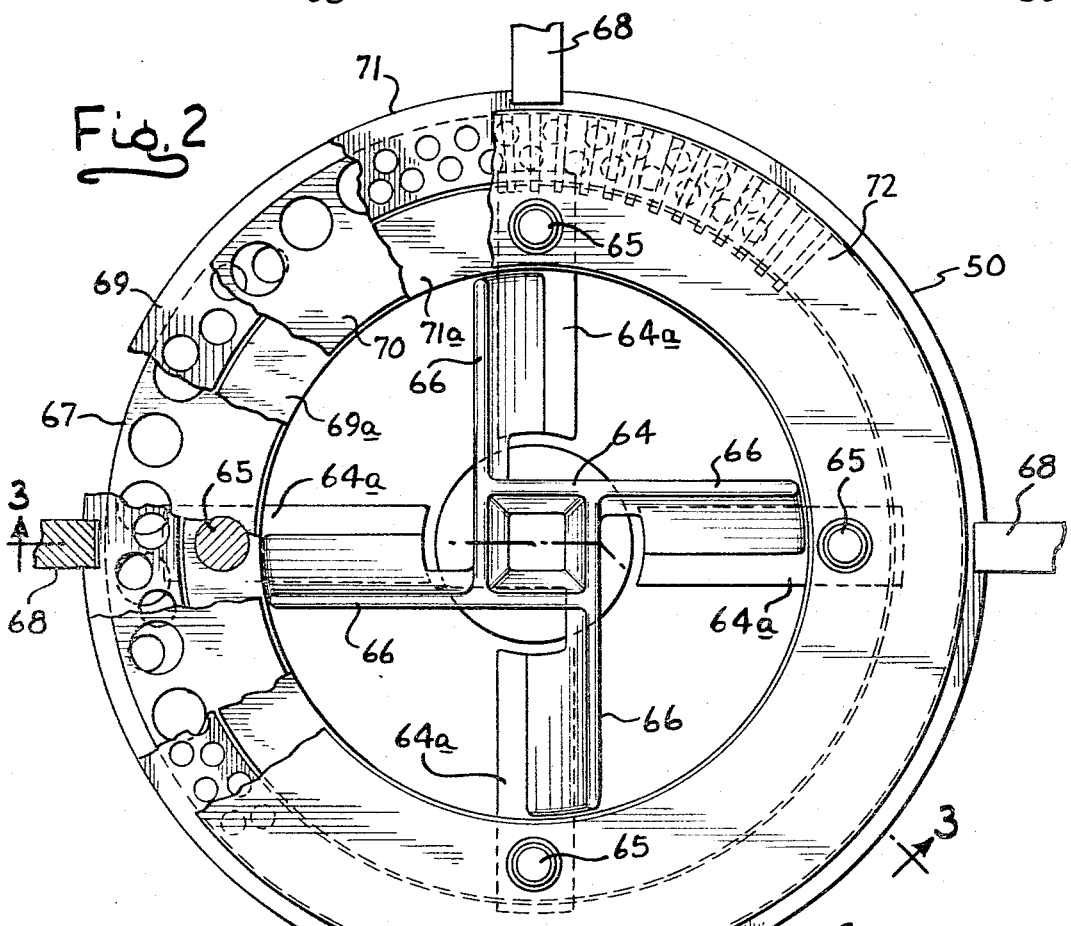

Aug. 8, 1967  A. W. HUGHES  3,334,674
COMBINATION EMULSIFYING AND DEAERATING MACHINE
FOR SAUSAGE BATTER AND THE LIKE
Filed Oct. 2, 1964  3 Sheets-Sheet 3
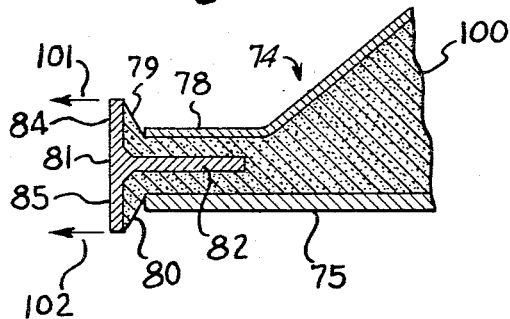
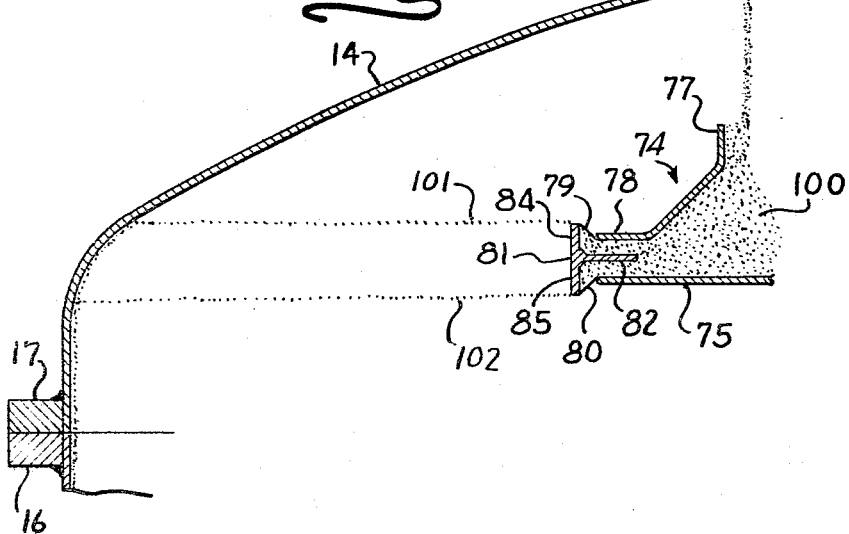
INVENTOR
ALVIN W. HUGHES
by: Wolfe, Hubbard, Voit & Osann
ATTYS.

United States Patent Office 3,334,674
Patented Aug. 8, 1967

3,334,674
COMBINATION EMULSIFYING AND DEAERATING MACHINE FOR SAUSAGE BATTER AND THE LIKE
Alvin W. Hughes, 4 N. 194 Church Road, Bensenville, Ill. 60106
Filed Oct. 2, 1964, Ser. No. 401,157
9 Claims. (Cl. 146—192)

The present invention relates generally to deaerating machines and more particularly to improved means for emulsifying and deaerating sausage batter or the like.

It is an object of the present invention to provide an emulsifying and deaerating machine for sausage batter and the like which is capable of emulsifying and removing entrained air in a more efficient and rapid manner than possible with prior staged devices thereby reducing the total manufacturing cost for treatment per pound of batter.

It is another object of the present invention to provide an emulsifying and deaerating machine for sausage batter or the like which enables a more stable, fat retaining product to be produced with a lower heat input yet enabling greatly reduced power consumption.

It is still another object to provide a vacuum-type emulsifying and deaerating machine which not only permits more rapid and efficient flow of sausage batter through the emulsifying means but which effectively and efficiently removes entrained air to produce a desired dense product. Consequently, it is an object to provide an emulsifying and deaerating machine which is more efficient than machines previously employed.

Other objects and advantages will become apparent upon reading the attached detailed description and upon reference to the drawings in which:

FIG. 2 is a top plan sectional view of the emulsifier with various parts broken away at different levels.

FIG. 3 is a section taken along the line 3—3 in FIG. 2 showing the path of flow of the material through the emulsifier.

FIG. 4 is a fragmentary section taken through the periphery of the impeller disc showing the radial extrusion path.

FIG. 5 is a fragmentary section of the top portion of the machine in FIG. 1 showing the path of flow of the material in the machine.

Figure 1:
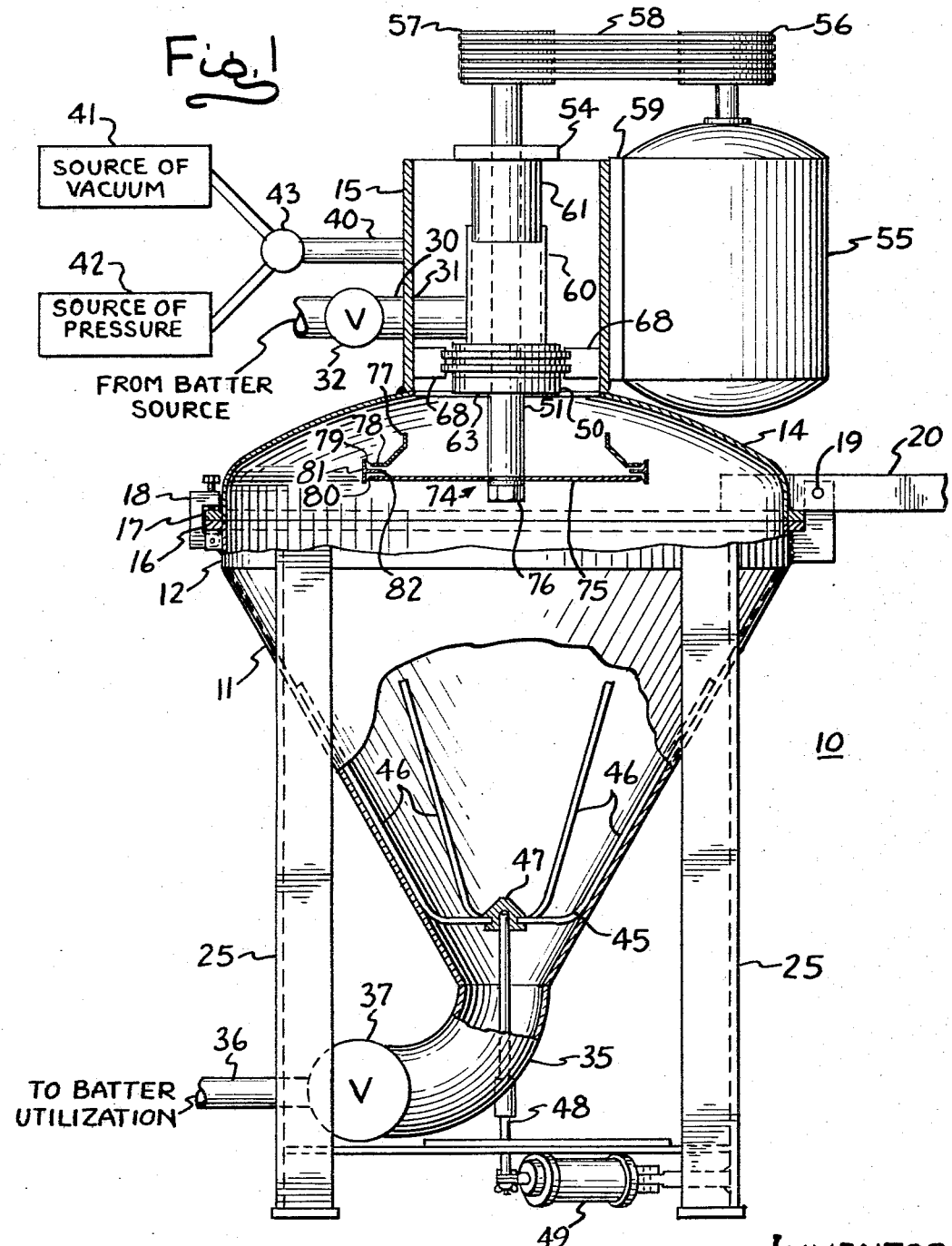
FIGURE 1 is an elevational view of an emulsifying and deaerating machine constructed in accordance with the present invention and with portions shown broken away to reveal the internal construction.

While the invention is described herein in connection with a certain illustrative embodiment, it will be understood that there is no intention to limit the invention to the particular form shown, but, on the contrary, I intend to cover the various alternative modifications and equivalent constructions included within the spirit and scope of the appended claims.

Turning now to the drawings, there is disclosed in FIG. 1 an emulsifying and deaerating machine 10 having a body 11 in the shape of an inverted cone joined to a cylindrical section 12. A dome-shaped cover 14 having an upstanding cylindrical stack 15 encloses the chamber thus formed. For the purpose of effecting securance of the body to the cover, mating flanges 16, 17 on the body and cover respectively are held together by means of a plurality of quick disconnect clamps 18. A suitable gasket or O-ring may be provided to effect a seal between the body and cover. The cover 14 is preferably hinged to the body by a hinge 19 and counterweighted by a counterweight (not shown) mounted at the end of arm 20 welded or otherwise secured to the top.

The body is supported in the present instance on a set of vertical legs 25 made of angle iron or the like and which may be four in number, equally spaced about the periphery.

For the purpose of admitting batter from a pressurized source, a batter inlet fitting 30 is provided which communicates with an inlet conduit 31 via an inlet valve 32. For the purpose of discharging collected batter, the lower end of the conical housing terminates in an elbow 35 which communicates with a discharge conduit 36 via a discharge valve 37.

For the purpose of cyclically evacuating and pressurizing the chamber, an air fitting 40 is provided communicating with a source of vacuum 41 and a source of pressure 42 via a selector valve 43. It will be understood that the term "source of vacuum" is simply used for the sake of convenience and such "source" may, for example, be a vacuum pump capable within a short space of time of drawing a vacuum within the chamber on the order of 26" of mercury. Analogously, the source of pressure 42 may be a compressor and suitable reservoir so that when the valve 43 is switched to its "pressure" state, full pressure, which may be on the order of 14–25 lbs. p.s.i. may be promptly developed.

For the purpose of preventing any tendency of batter in the chamber to cling to the wall of the chamber, a spider 45 having legs 46 secured to a hub 47 is provided, driven by a shaft 48 connected to an actuator 49. Oscillation of the spider, by reducing adhesion of the batter to the side walls, permits gravity to operate more freely so that the collected batter tends to form a more well defined "plug."

The oscillated spider and means for establishing an alternating vacuum-pressure cycle are described in my co-pending applications, Ser. No. 309,629, filed Sept. 18, 1963, now Patent 3,189,940, and Ser. No. 318,725, filed Oct. 24, 1963, now Patent 3,189,939 respectively, to which cross-reference is made.

In accordance with the present invention, an emulsifier is provided having rotatable cutting members and nonrotatable perforate rings at the upper end of the chamber and with means for centrifugally and forcibly moving the material through the emulsifying rings from whence the batter is slung outwardly into contact with the inner wall of the chamber. The batter flows, by gravity, to a rotating impeller disc or extruding member below the emulsifier rings having a narrow slot about its periphery, so that a thin sheet of batter is centrifugally flung outwardly from the edge of the impeller into contact with the inner wall of the chamber from where the batter flows, by gravity, to the lower end of the chamber where it is discharged during the pressure portion of the cycle. Thus referring to FIGS. 1, 2 and 3, there is provided an emulsifier assembly 50 including alternate rotatable and nonrotatable rings horizontally disposed on a shaft 51 which projects upwardly through a bushing or seal 54 in the upper wall of stack 15. The shaft 51 is driven by a motor 55 through pulleys 56, 57 and belts 58. The motor in this instance is a 60-horsepower high torque motor operating at about 1750 r.p.m. and which may be bolted to a flange 59 which is welded or otherwise secured to the stack 15 on the chamber.

In order to direct the incoming batter towards the center of the emulsifying assembly 50, inlet conduit 31 is connected to a sleeve 60 disposed about the shaft 51 thus forming a receptacle above the emulsifying assembly. A bushing 61 closes the opening at the top of the sleeve 60 to insure that the incoming batter is directed to the emulsifying assembly 50.

Detailed attention may be given to the emulsifying assembly 50 wherein impelling means is provided for radially forcing the batter outward of the center of the assembly. To this end the impelling means is formed by a feed ring 63 having an annular recess 63a formed on its upper surface mounted on shaft 51 and having a crossbar impeller 64 seated on the upstanding guide pins 65 which are carried by the feed ring. The pads 64a of the impeller are seated in the recess 63a and divide the recess, in the present instance, into quadrants. In order to provide for a more positive radial movement of the batter, the vanes 66 on the crossbar impeller are preferably inclined and in the present instance the vanes are inclined at an angle of about 15°, with respect to the direction of rotation.

As shown in FIGS. 2 and 3, a perforate feed ring 67 is disposed directly above the feed ring 63 and seated on guide pins 65. A nonrotatable primary sizing ring 69 is disposed directly above the feed ring 67 and is provided with radial slots that engage projections or ears 68 welded or otherwise secured to the stack 15. A ring spacer 69a which is slightly thicker than sizing ring 69 is secured to the guide pins 65 to maintain accurate spacing between the feed ring 67 and the next rotatable perforate transfer ring 70 which is disposed above the nonrotatable primary sizing ring 69. A secondary nonrotatable sizing ring 71 having slots which engage ears 68 to prevent rotation is disposed above the transfer ring 70. A ring spacer which is slightly thicker than sizing ring 71 is secured to the guide pins 65 to maintain accurate spacing between the rotatable transfer ring and a rotatable radially slotted discharge ring 72 which is secured to the guide pins 65.

When in operation, the incoming sausage material is directed to the center of the emulsifying assembly and the vanes 66 on the crossbar impeller direct the material outwardly and into the recesses 63a from which the material is directed upward through feed ring 67, primary sizing ring 69, transfer ring 70, secondary sizing ring 71, and finally, through discharge ring 72 which centrifugally "hurls" the material outwardly against the inner wall of stack 15. As the material passes through the holes and slots of these rotatable and nonrotatable rings, it is subjected to millions of cutting and shearing actions.

In order to appreciate the amount of cutting and shearing action to which the material is subjected for producing the desired finely divided material emerging from the emulsifying assembly, the rings and the number of cutting edges presented thereby are enumerated as follows:

67 (rotatable feed ring)—36 perforations
69 (nonrotatable primary sizing ring)—60 perforations
70 (rotatable transfer ring)—36 perforations
71 (nonrotatable secondary sizing ring)—120 perforations
72 (rotatable discharge ring)—120 discharge slots It may be readily appreciated that between rings 67 and 69 having 36 and 60 perforations respectively, there is a potential of 36 times 60 or 2160 cuts that can be delivered to the material per revolution. Between rings 69 and 70 having 60 and 36 perforations respectively, there is again a potential of 2160 cuts that may be delivered per revolution. Similarly, a potential of 4320 cuts per revolution between plates 70 and 71 having 36 and 120 perforations respectively and a potential of 14,400 cuts per revolution can be delivered between rings 71 and 72. The total potential for cutting in one revolution amounts to 23,040 cuts and with the motor turning at 1750 r.p.m., the total amount of cuts per minute that can be delivered to the material amounts to 40,320,000.

The spacer rings 69a, 71a coplanar with the nonrotatable rings and disposed between the rotatable rings, as previously stated, are slightly thicker than the nonrotatable rings, which greater thickness can vary from .002 to .004 of an inch in accordance with the material being handled, so that in operation the material spaces the nonrotatable rings, which can move axially on ears 68, substantially equally between the rotatable rings. Since there is a spacing ring between the rotatable and nonrotatable rings, the emulsifying assembly operates without metal to metal contact which greatly minimizes friction between the rings with the result that the amount of wear on the rings is practically nil. More important a lower heat input in the product is achieved which is desirable in sausage batter because overheating promotes instability which contributes to the release of fat and grease from the finished product.

In accordance with another important aspect of the present invention, there is provided, a rotating impeller discs or extruding member and means for containing batter deposited thereon so that centrifugal force is built up to produce extrusion in the form of a thin sheet that is slung outwardly from the impeller edge into contact with the inner wall of the chamber whereby the batter flows by gravity to the lower end of the chamber where it is discharged during the pressure portion of the cycle. Thus, referring to FIG. 1, the impeller disc assembly 74 includes a circular disc 75 which is horizontally arranged and secured to the lower end of a shaft 51 by way of a retaining nut 76.

For the purpose of insuring a sufficient build-up of centrifugal force to effect extrusion of the viscous batter at the periphery of disc 75, a substantially frusto-conical shaped hood having an upstanding edge 77 and a substantially horizontal edge 78 which is spaced from the disc 75 are provided. The hood serves to receive batter flowing from the emulsifier assembly and prevents this batter from spilling over the edge of the impeller disc while also insuring that the batter will leave the impeller disc via the extrusion slots 79, 80 provided at the periphery.

For the purpose of thinning out the stream flowing from the periphery of the disc and for the purpose of axially separating the batter into two streams, parallel extrusion slots 79, 80 in FIGS. 4 and 5 are formed by an annular separating vane 81. The separating vane is T-shaped in cross-section and includes a central leg 82 and two arms 84, 85 projecting at right angles thereto. The means for clamping the vane member in position and more detailed reference to a rotating impeller disc or extruding member in accordance herewith is described in my copending application Ser. No. 318,725, filed October 24, 1963, now Patent 3,189,939, to which cross reference is made.

In considering the operation of this aspect of the present invention, it will be assumed that the valve 43 is set to pull the desired vacuum in the chamber before the motor 55 is turned on. Also it will be assumed that the batter inlet valve 32 is open simultaneously with the operation of motor 55 so that batter is free to flow through the inlet conduit by the combined action of the vacuum and pressure at the batter source. Under these conditions and with the outlet valve 37 closed, batter flowing through inlet conduit 31 enters sleeve 60 where it goes through the emulsifier assembly as previously described. The batter, indicated at 100 in FIG. 5, upon leaving the emulsifier is slung against the inner wall of stack 15 where it flows by gravity, in the presence of the vacuum, on to the rotating impeller. This batter is immediately accelerated and moves, under the action of centrifugal force, into the annular space defined by the impeller disc 75 and the hood at the impeller periphery.

With the disc rotating at a speed on the order of 1750 r.p.m., a sufficiently high extrusion force is developed to produce positive flow of the batter through the peripheral extrusion slots. Thus the batter flows through the peripheral extrusion slots and is diverted in opposite directions through an angle of approximately 90° by the arms 84, 85 of the vane member 81. The flowing streams of batter are thinned down so that the batter is slung outward in sheet-like formation in spaced streams as shown at 101, 102 in FIG. 4. The sheets of batter, on the order of a few hundredths of an inch thick, being in contact with the vacuum atmosphere on both sides enables any air which is entrained within the batter to be immediately liberated under the action of vacuum. It has been found that deaeration of the sausage batter is practically instantaneous and substantially complete, employing a vacuum on the order of 26" of mercury, by the time the streams 101, 102 strike the wall of the chamber and begin their downward flow under the action of gravity in the vacuum atmosphere.

After the deaerated batter strikes the side walls of the chamber gravitating downwardly along the wall and after the batter has built up to a desired level or a predetermined amount of time has elapsed, the batter is discharged under the pressure portion of the alternating cycle.

While the present invention has been described with regard to a particular application to the emulsification and deaeration of sausage batter, it will be apparent that the invention is not necessarily limited thereto and it is usable whenver it is desired to emulsify and deaerate a fluid or semi-fluid material.

I claim as my invention:

1. An apparatus for emulsifying and deaerating sausage batter or the like, comprising in combination an enclosed chamber having a body portion and a cover, said cover terminating in an elongated cylindrical stack, an inlet conduit extending into said stack and connected to a source of batter, means for pulling a vacuum in said chamber, a drive shaft centrally disposed within said stack and projecting into said chamber, means mounted on said chamber for rotating the shaft, a plurality of spaced alternating rotatable and nonrotatable rings disposed about said shaft radially spaced within said stack, impeller means mounted on said shaft beneath said rings for moving said batter radially outward, said impeller having means for feeding the batter axially through perforations in said rotatable and nonrotatable rings whereby the fed batter is cut into finer pieces, at least one of said rotatable rings being provided with radial slots for centrifugal discharge of the batter into contact with the inner wall of said stack, an impeller disc mounted on said shaft spaced below said stack, adapted to receive batter flowing downwardly from said stack, means at the periphery of the disc for defining a pair of parallel peripheral slots for forming outwardly moving flat streams of batter as the disc is rotated, and means between the slots for relatively diverting the outwardly moving streams of batter axially in opposite directions to form separate thin sheets of batter substantially spaced from one another for removal of entrained air by the vacuum in said chamber prior to the sheet striking the side walls of the chamber, the chamber being so formed that the batter striking the walls flows downwardly by gravity, and means at the lower end of the chamber for removing the collected deaerated batter from the chamber.

2. An apparatus for emulsifying and deaerating sausage batter or the like, comprising in combination an enclosed chamber having a body portion and a cover, said cover terminating in an elongated cylindrical stack, an inlet conduit extending into said stack and connected to a source of batter, means for pulling a vacuum in said chamber, a drive shaft centrally disposed within said stack and projecting into said chamber, means mounted on said chamber for rotating the shaft, a plurality of spaced alternating rotatable and nonrotatable rings disposed about said shaft radially spaced within said stack, impeller means mounted on said shaft beneath said rings for moving said batter radially outward, said impeller having means for feeding the batter axially through perforations in said rotatable and nonrotatable rings whereby the fed batter is cut into finer pieces, at least one of said rotatable rings being provided with radial slots for centrifugal discharge of the batter into contact with the inner wall of said stack, an impeller disc mounted on said shaft spaced below said stack, a hood overlying the impeller disc adapted to receive batter flowing downwardly from said stack and extending substantially to the periphery of said impeller disc to define an annular space, means at the periphery of the disc for defining a pair of parallel peripheral slots for forming two outwardly moving flat streams of batter as the disc is rotated, and means between the slots for relatively diverting the outwardly moving streams of batter axially in opposite directions to form separate thin sheets of batter substantially spaced from one another for removal of entrained air by the vacuum in said chamber prior to the sheet striking the side walls of the chamber, the chamber being so formed that the batter striking the walls flows downwardly by gravity, and means at the lower end of the chamber for removing the collected deaerated batter from the chamber.

3. In an apparatus for emulsifying and deaerating sausage batter or the like, the combination comprising an enclosed vacuum pressure chamber having a generally conical body portion and a cover terminating in a cylindrical stack, an inlet conduit having an inlet valve connected to a source of batter under pressure communicating with said stack, a drive shaft centrally disposed and rotatably sealed within said stack extending into said chamber, drive means for rotating the shaft at relatively high speed, a plurality of rotatable rings driven by said shaft radially spaced within said stack, nonrotatable rings disposed between said rotatable rings, impeller means mounted on said shaft having a veined portion within said rings and an annular slotted portion beneath the lowermost one of said rotatable rings, said nonrotatable rings and at least one of said rotatable rings being perforated so that when the batter is forced axially through said perforations the fed batter is cut into fine pieces between the edges of the perforations in the rotatable rings and the edges in the nonrotatable rings respectively, at least one of said rotatable plates having slots open at their outer ends for centrifugal discharge onto the inner wall of said stack from whence the batter flows downwardly by gravity, a hollow impeller disc mounted at the lower end of said drive shaft having an annular hood for receiving the batter flowing downwardly from said stack, means at the periphery of the impeller for defining a pair of parallel peripheral slots for forming outwardly moving flat sheets of batter as the disc rotates for acting upon by the vacuum as the batter flows from the periphery of the impeller to the side wall of the chamber, and means at the lower end of the chamber for removing the deaerated batter during the application of pressure.

4. In an apparatus for emulsifying and deaerating sausage batter or the like, the combination comprising an enclosed vacuum pressure chamber having a generally conical body portion and a cover terminating in a cylindrical stack, an inlet conduit having an inlet valve connected to a source of batter under pressure communicating with said stack, a drive shaft centrally disposed and rotatably sealed within said stack extending into said chamber, drive means for rotating the shaft at relatively high speed, a plurality of rotatable rings driven by said shaft radially spaced within said stack, nonrotatable rings disposed between said rotatable rings, impeller means mounted on said shaft having a vaned portion within said rings and an annular slotted portion beneath the lowermost one of said rotatable rings, said nonrotatable rings and at least one of said rotatable rings being perforated so that when the batter is forced axially through said perforations the fed batter is cut into fine pieces between the edges of the perforations in the rotatable rings and the edges in the nonrotatable rings respectively, at least one of said rotatable rings having slots open at their outer ends for centrifugal discharge onto the inner wall of said stack from whence the batter flows downwardly by gravity, and means at the lower end of the chamber for removing the deaerated batter during the application of pressure.

5. An apparatus for emulsifying and deaerating sausage batter or the like, comprising in combination an enclosed chamber having a body portion and a cover, said cover terminating in an elongated cylindrical stack, an inlet conduit extending into said stack and connected to a source of batter, means for pulling a vacuum in said chamber, a drive shaft centrally disposed within said stack and projecting into said chamber, means mounted on said chamber for rotating the shaft, a plurality of spaced alternating rotatable and nonrotatable rings disposed about said shaft radially spaced within said stack, means including spacer rings disposed between said rotating rings and coplanar with said nonrotating rings, impeller means mounted on said shaft beneath said rings for moving said better radially outward, said impeller having means for feeding the batter axially through perforations in said rotatable and nonrotatable rings whereby the fed batter is cut into finer pieces, at least one of said rotatable rings being provided with radial slots for centrifugal discharge of the batter into contact with the inner wall of said stack, an impeller disc mounted on said shaft spaced below said stack adapted to receive batter flowing downwardly from said stack, means at the periphery of the impeller for defining peripheral slots for forming outwardly moving flat sheets of batter as the disc rotates for acting upon by the vacuum as the batter flows from the periphery of the impeller to the side wall of the chamber, and means at the lower end of the chamber for removing the deaerated batter during the application of pressure.

6. An apparatus as claimed in claim 5 wherein said spacer rings are .002–.004 inch thicker than said nonrotating rings.

7. In an apparatus for emulsifying and deaerating sausage batter or the like, the combination comprising an enclosed vacuum pressure chamber having upper and lower end portions, an inlet conduit connected to a source of batter under pressure communicating with said upper end, means including a rotatable drive shaft extending into said chamber upper end portion, a plurality of rotatable rings driven by said shaft, non-rotatable rings disposed between said rotatable rings, impeller means mounted on said shaft having a vaned portion disposed within at least the lowermost one of said rings and an annular slotted portion beneath the lowermost one of said rotatable rings, said non-rotatable rings and at least one of said rotatable rings being perforated so that when the batter is forced axially through said perforations the fed batter is cut into fine pieces between the edges of the perforations in the rotatable rings and the edges in the non-rotatable rings respectively, means associated with at least one of said rotatable rings for centrifugally discharging said batter radially therefrom whence the batter flows downwardly in said chamber by gravity, and means at the lower end of the chamber for removing the deaerated batter during the application of pressure.

8. An apparatus for emulsifying and deaerating sausage batter or the like, comprising in combination an enclosed chamber having upper and lower end portions, an inlet conduit extending into said upper end portion of the chamber and connected to a source of batter, means for pulling a vacuum in said chamber, a rotatable drive shaft projecting into said chamber upper end portion, a plurality of spaced alternating rotatable and nonrotatable rings disposed about said shaft within said chamber, means including spacer rings disposed between said rotating rings and coplanar with said non-rotating rings, impeller means mounted on said shaft beneath said rings for moving batter received thereon radially outward, said impeller having means for feeding the batter axially through perforations in said rotatable and non-rotatable rings whereby the fed batter is cut into finer pieces, at least one of said rotatable rings being provided with radial slots for centrifugal discharge of the batter therefrom for acting upon by the vacuum as the batter flows downwardly in the chamber by gravity, and means at the lower end of the chamber for removing the deaerated batter.

9. An apparatus for emulsifying and deaerating sausage batter or the like, comprising in combination an enclosed vacuum-pressure chamber having upper and lower end portions, an inlet conduit extending into said upper end portion of the chamber and connected to a source of batter under pressure, means for pulling a vacuum in said chamber, a rotatably driven shaft projecting into said chamber upper end, a plurality of spaced alternating rotatable and non-rotatable rings disposed about said shaft radially spaced within said chamber, impeller means mounted on said shaft beneath said rings for moving said batter radially outward, said impeller having means for feeding the batter axially through perforations in said rotatable and non-rotatable rings whereby the fed batter is cut into finer pieces, means associated with at least one of said rotatable rings for centrifugally discharging of the batter therefrom for acting upon by the vacuum as the batter flows downwardly in the chamber by gravity, and means at the lower end of the chamber for removing the deaerated batter during the application of pressure.

References Cited

UNITED STATES PATENTS

| | | | |
|---|---|---|---|
| 2,425,912 | 8/1947 | Appel et al. | 146—78 |
| 3,123,116 | 3/1964 | Hughes | 146—192 |
| 3,189,939 | 6/1965 | Hughes | 17—35 |

WILLIAM W. DYER, Jr., *Primary Examiner.*

W. GRAYDON ABERCROMBIE, *Examiner.*